United States Patent
Cho et al.

(10) Patent No.: US 11,136,020 B2
(45) Date of Patent: Oct. 5, 2021

(54) HYBRID VEHICLE AND METHOD OF CALIBRATING TRAVELING DIRECTION FOR THE SAME

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Seong Wook Moon, Seoul (KR); Sung Bae Jeon, Ansan-si (KR); Hui Un Son, Suwon-si (KR); Joon Young Park, Seoul (KR); Jea Mun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/995,443

(22) Filed: Aug. 17, 2020

(65) Prior Publication Data

US 2021/0101584 A1    Apr. 8, 2021

(30) Foreign Application Priority Data

Oct. 7, 2019 (KR) .................. 10-2019-0123668

(51) Int. Cl.
*B60W 20/30* (2016.01)
*B60W 10/10* (2012.01)
*B60W 20/40* (2016.01)
*B60W 20/12* (2016.01)
*B60W 10/02* (2006.01)
(Continued)

(52) U.S. Cl.
CPC ............ *B60W 20/30* (2013.01); *B60W 10/02* (2013.01); *B60W 10/08* (2013.01); *B60W 10/10* (2013.01); *B60W 20/12* (2016.01); *B60W 20/40* (2013.01); *B60W 20/50* (2013.01); *B60W 2510/081* (2013.01); *B60W 2520/10* (2013.01); *B60W 2540/20* (2013.01); *B60W 2554/801* (2020.02);
(Continued)

(58) Field of Classification Search
CPC ...... B60W 20/30; B60W 20/12; B60W 10/10; B60W 20/40; B60W 10/02; B60W 10/08; B60W 20/50; B60W 2510/081; B60W 2520/10; B60W 2540/20; B60W 2554/801; B60W 2710/021; B60W 2710/1005
USPC .......................................................... 701/63
See application file for complete search history.

(56) References Cited

U.S. PATENT DOCUMENTS 10,150,466 B2 *  12/2018  Kang .............. B60W 30/18036
2018/0072302 A1 *  3/2018  Iwashita ............... B60W 10/08

FOREIGN PATENT DOCUMENTS

JP            4914787 B2    4/2012
KR    10-2018-0072564 A    6/2018

* cited by examiner

*Primary Examiner* — Roger L Pang

(57) ABSTRACT

A hybrid vehicle and a method of calibrating a traveling direction of the hybrid vehicle are disclosed. The method of calibrating a traveling direction of a hybrid vehicle including a transmission not having a reverse gear includes: when an abnormality of a motor speed sensor is detected, calculating a difference between at least one of a first moving distance calculated based on sensor information during a predetermined time or a second moving distance calculated based on output torque and a third moving distance calculated based on a vehicle speed by a controller for controlling output torque; when an absolute value of the calculated difference is greater than a preset error reference, reversing the trav- (Continued)

eling direction recognized by the controller; and controlling a powertrain in response to a transmission lever state.

19 Claims, 7 Drawing Sheets

(51) Int. Cl.
*B60W 10/08* (2006.01)
*B60W 20/50* (2016.01)
(52) U.S. Cl.
CPC ................ *B60W 2710/021* (2013.01); *B60W 2710/1005* (2013.01)

HYBRID VEHICLE AND METHOD OF CALIBRATING TRAVELING DIRECTION FOR THE SAME

CROSS-REFERENCE TO RELATED APPLICATION

This application claims priority to and the benefit of Korean Patent Application 10-2019-0123668, filed on Oct. 7, 2019, the entire contents of which are hereby incorporated by reference.

FIELD

The present disclosure relates to a hybrid vehicle and a method of calibrating a traveling direction therefor.

BACKGROUND

The statements in this section merely provide background information related to the present disclosure and may not constitute prior art.

Recently, as interest in the environment increases, there has been a great deal of research on eco-friendly vehicles. A representative an eco-friendly vehicle includes an electric vehicle (EV) or a hybrid electric vehicle (HEV).

A hybrid electric vehicle (HEV) is a vehicle that uses two power sources, typically an engine and an electric motor. An HEV has excellent fuel efficiency and engine performance compared with a vehicle having only an internal combustion engine and is also advantageous for lowering emissions, and thus has been actively developed recently.

Such a hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode of operating both an electric motor and an engine to generate driving power. A hybrid vehicle switches between the two modes according to driving conditions. In general, switch between traveling modes is performed to improve fuel efficiency or driving efficiency depending on the efficiency characteristics of a powertrain.

SUMMARY

The present disclosure provides a method of calibrating a traveling direction and a hybrid vehicle for performing the same for determining a traveling direction even if abnormality of a speed sensor of a motor occurs in a hybrid vehicle including a transmission without a reverse gear.

In one form of the present disclosure, a method of calibrating a traveling direction of a hybrid vehicle including a transmission without a reverse gear includes: when an abnormality of a motor speed sensor is detected, calculating a difference between at least one of a first moving distance calculated based on sensor information during a predetermined time or a second moving distance calculated based on output torque and a third moving distance calculated based on a vehicle speed by a controller for controlling output torque; when an absolute value of the difference is greater than a preset error reference, reversing the traveling direction recognized by the controller; and controlling a powertrain in response to a transmission lever state.

In another aspect of the present disclosure, a hybrid vehicle includes: a transmission not having a reverse gear, a driving motor including a speed sensor, and a second controller configured to calibrate a traveling direction recognized by a first controller configured to control output torque when detecting abnormality of the speed sensor, wherein the second controller includes a traveling direction determiner configured to calculate a difference between at least one of a first moving distance calculated based on sensor information during a predetermined time or a second moving distance calculated based on output torque and a third moving distance calculated based on a vehicle speed by a controller for controlling output torque, and when an absolute value of the difference is greater than a preset error reference, to reverse the traveling direction recognized by the first controller, and a safety mode controller configured to control a powertrain in response to a transmission lever state.

Further areas of applicability will become apparent from the description provided herein. It should be understood that the description and specific examples are intended for purposes of illustration only and are not intended to limit the scope of the present disclosure.

DRAWINGS

Further areas of applicability will become apparent from the description provided herein. It should be understood that the description and specific examples are intended for purposes of illustration only and are not intended to limit the scope of the present disclosure.

Figure 1:
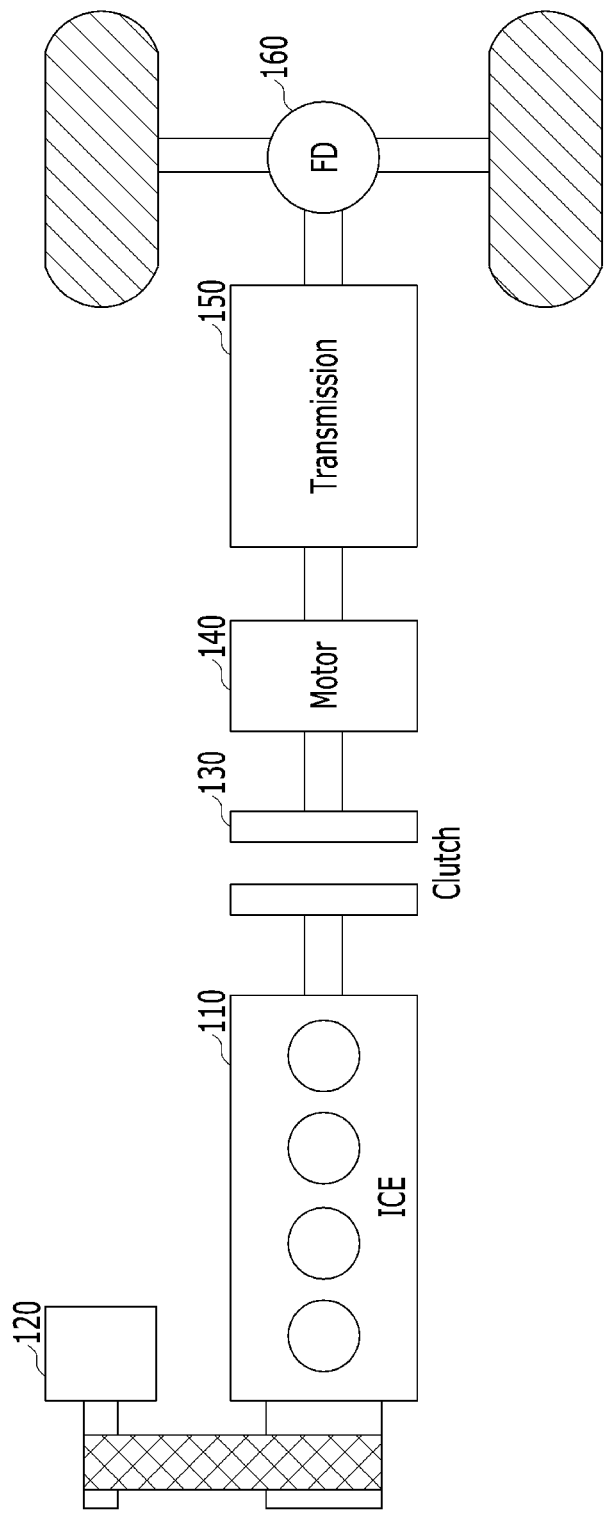
FIG. 1 is a diagram illustrating an example of a powertrain structure of a hybrid vehicle to which forms of the present disclosure are applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement with reference to the accompanying drawings. However, the present disclosure may be implemented in various different forms and is not limited to these forms. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

FIG. 1 is a diagram illustrating an example of a powertrain structure of a general hybrid vehicle.

FIG. 1 illustrates a powertrain structure of a hybrid vehicle employing a parallel type or transmission mounted electric drive (TMED) method.

Referring to FIG. 1, an electric motor 140 (or a driving motor) and an engine clutch 130 are disposed between an internal combustion engine (ICE) 110 and a transmission 150.

In such a vehicle, in general, when a driver presses an accelerator after turning on the vehicle, the motor 140 is driven using power of a battery while the engine clutch 130 is open and transmits power of the motor to move wheels through the transmission 150 and a final drive (FD) 160 (i.e., EV mode). As the vehicle gradually accelerates, high driving force is further desired and, in this case, auxiliary motor (or a starter generator motor 120) may be operated to drive the engine 110.

Accordingly, when rotational speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is open (i.e., disengaged) and the engine 110 stops (i.e., transition to an EV mode from an HEV mode). In addition, the hybrid vehicle converts driving force of a wheel into electric energy to recharge a battery, which is referred to as braking energy regeneration or regenerative brake.

The starter generator motor 120 functions as a starter motor when the engine is turned on and functions as a generator after the engine is turned on or when rotational energy is recovered during engine off and, thus, the starter generator motor 120 may also be referred to as a hybrid starter generator (HSG) and, as necessary, may be referred to as an auxiliary motor.

However, unlike the engine 110, the motor 140 is capable of changing a rotational direction thereof, and when reversing is needed, backlashing of a driving shaft is possible without a reverse (R) gear in the transmission 150, which will be described with reference to FIGS. 2A and 2B.

Figure 2A:
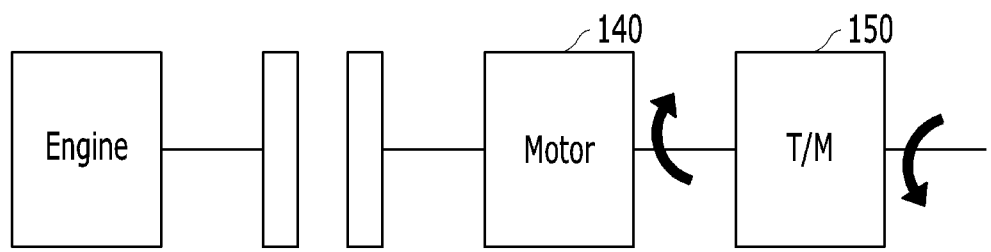
FIGS. 2A and 2B are diagrams for explaining the case in which a hybrid vehicle is reversed when a transmission without a reverse gear is applied.
Figure 2B:
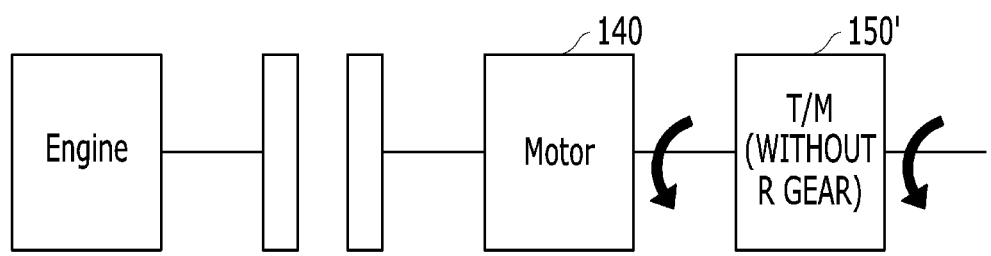

FIGS. 2A and 2B are diagrams for explaining the case in which a hybrid vehicle is reversed when a transmission without a reverse gear is applied. In FIGS. 2A and 2B, it is assumed that a hybrid vehicle is reversed in a state in which an engine clutch is open.

First, referring to FIG. 2A, when an R gear is embodied in the transmission 150, if the motor 140 is rotated in a forward direction (i.e., the same direction as a rotation direction of an engine), the transmission 150 may change a rotation direction to a reverse direction in the R gear, and an output end of the R gear is rotated in a backward direction.

In contrast, as shown in FIG. 2B, when the R gear is omitted from a transmission 150', if the motor 140 is rotated in a backward direction, both input and output ends of the transmission 150' in a first gear state are rotated in a backward direction. Thus, even if the R gear is omitted from the transmission, the motor 140 is capable of being reversed in a parallel type hybrid vehicle, and durability and fuel efficiency are expected to be enhanced using a simple structure of the transmission 150'.

In a hybrid vehicle (HEV/PHEV), a value of a wheel sensor or a transmission speed sensor is multiplied by a wheel radius and the result is used to determine a vehicle speed, and in this regard, the wheel sensor or the transmission speed sensor are capable of detecting a rotation speed but are not capable of detecting a rotation direction. This is because, in a general internal combustion engine vehicle, a rotation direction of an engine is fixed, and the case in which a rotation direction of the engine and a traveling direction are different corresponds to only an R gear state of the transmission. However, when a transmission without an R gear is applied to a hybrid vehicle, if driving shaft of an engine is not transferred to a driving shaft, a rotation direction of the motor 140 is a traveling direction, and thus, a traveling direction is detected through a speed sensor included in the motor 140. As a result, in such a hybrid vehicle, when a speed sensor included in the motor 140 malfunctions, there is a problem in that a reference signal for determining a traveling direction of a vehicle is not present.

The problem may cause an abnormal acceleration phenomenon, in particular, when a vehicle is initially driven, which will be described with reference to FIGS. 3A and 3B.

Figure 3A:
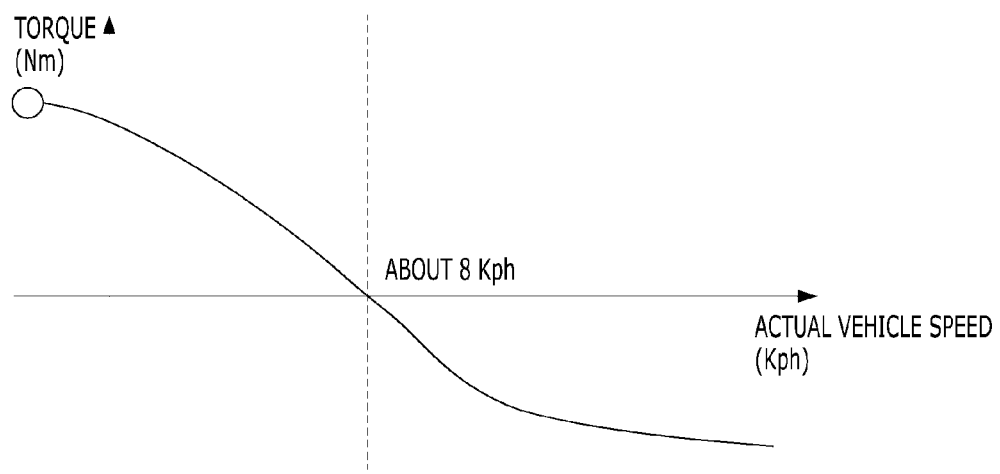
FIGS. 3A and 3B are diagrams for explaining an example of excessive output of creep torque due to misrecognition of a traveling direction when a speed sensor of a motor malfunctions.
Figure 3B:
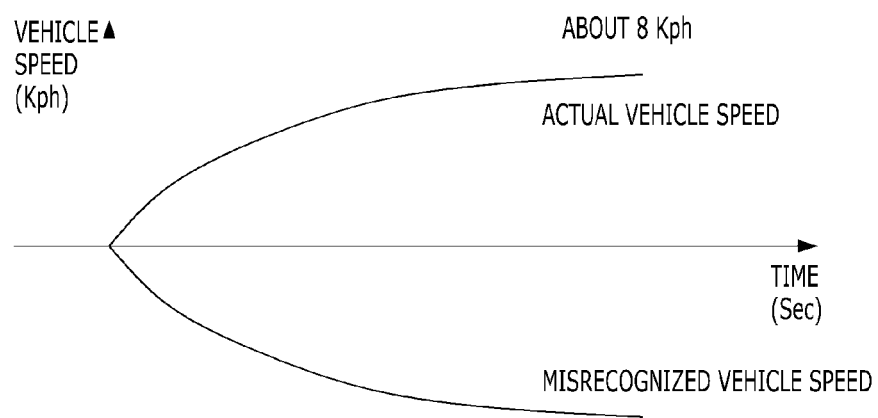

FIGS. 3A and 3B are diagrams for explaining an example of excessive output of creep torque due to misrecognition of a traveling direction when a speed sensor of a motor malfunctions.

First, referring to FIG. 3A, in order to copy creep torque and engine drag of an internal combustion engine vehicle in a situation in which there is no pedal manipulation, a hybrid vehicle is controlled to gradually reduce positive creep torque before a specific vehicle speed (here, 8 Kph) and is controlled to output negative torque after a specific vehicle speed. As a result, a vehicle speed converges on a specific vehicle speed as long as there is no pedal manipulation.

When such torque control is performed, a hybrid vehicle is actually driven forward in a transmission D gear, but a controller for calculating vehicle driving force misrecognizes a traveling direction due to abnormality of a speed sensor of a motor, and thus, recognizes a vehicle speed as a minus value as shown in FIG. 3B. Thus, creep torque output from a vehicle is a value corresponding to a minus vehicle speed in a D gear situation, and such a value is a relatively large value compared with a case in which a vehicle travels forward, and thus, there is a problem in that the vehicle is continuously accelerated to exceed 8 Kph without manipulation of an accelerator pedal.

Prior to a description of a method of calibrating a traveling direction according to exemplary forms of the present disclosure, a relationship between controllers of a hybrid vehicle applicable to the forms will be described with reference to FIG. 4.

Figure 4:
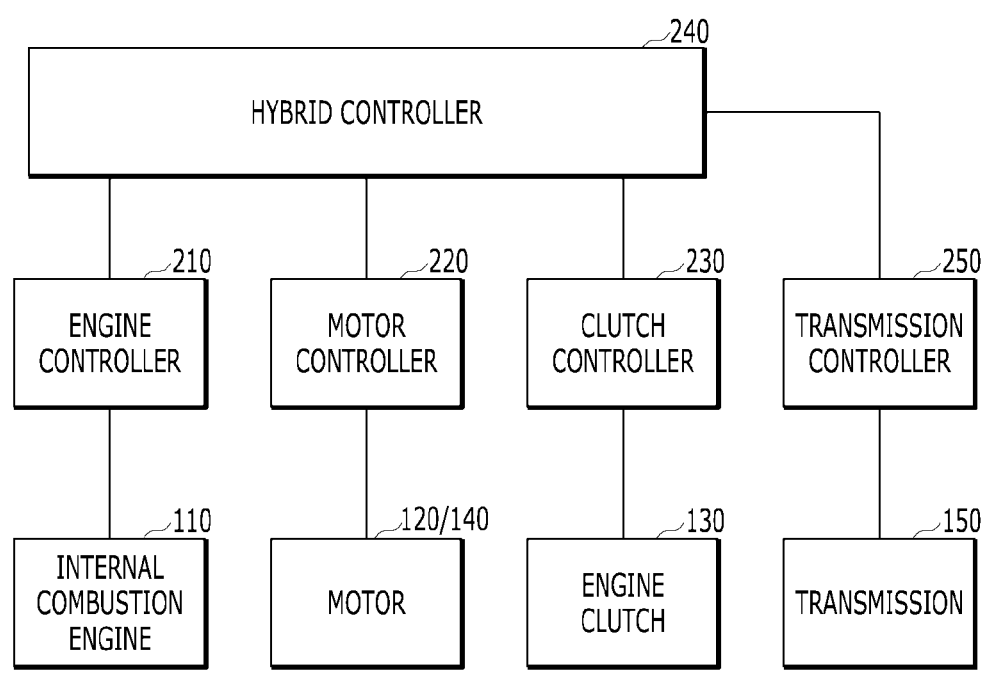
FIG. 4 is a block diagram showing an example of a control system of a hybrid vehicle in one form of the present disclosure.

FIG. 4 is a block diagram showing an example of a control system of a hybrid vehicle to which forms of the present disclosure are applicable.

Referring to FIG. 4, an internal combustion engine 110 may be controlled by an engine controller 210, torque of a starter generator motor 120 and a motor 140 may be controlled by a motor control unit (MCU) 220, and an engine clutch 130 may be controlled by a clutch controller 230. Here, an engine controller 210 may also be referred to as an engine management system (EMS). In addition, a transmission 150' may be controlled by a transmission controller 250.

In one form, the starter generator motor 120 and the motor 140 may be controlled by different separate motor controllers.

Each controller may be connected to a hybrid control unit (HCU) 240 for controlling an overall mode switching procedure as a high-level controller and may provide information desired to switch driving modes and to control an engine clutch during gear shift, and/or information desired to control engine off or may perform an operation according to a control signal under control of a hybrid controller 240.

In more detail, the hybrid controller 240 may determine whether modes are switched depending on a driving state of a vehicle. For example, the hybrid controller may determine an open time of the engine clutch (EC) 130 and may control hydraulic pressure (in the case of a wet EC) or control torque capacity (in the case of a dry EC) when the EC is open. The hybrid controller 240 may determine an EC state (lock-up, slip, open, etc.) and may control a time for stop of fuel injection of the engine 110. The hybrid controller may transmit a torque command for controlling torque of the starter generator motor 120 to the MCU 220 to control engine off and may control engine rotational energy recovery. In addition, the hybrid controller 240 may determine a mode switching condition during control of adaptive mode switching and may control a low-level controller for mode switching.

Needless to say, it would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

Here, the terms, such as 'unit' 'controller,' or 'module', etc., should be understood as a unit that processes at least one function or operation and that may be embodied in a hardware manner (e.g., a processor), a software manner, or a combination of the hardware manner and the software manner.

According one form of the present disclosure, when abnormality occurs in a speed sensor of a motor in a hybrid vehicle to which a transmission without a reverse gear is applied, whether a traveling direction is misrecognized may be determined by comparing a moving distance determined by a controller for calculating output torque of a vehicle and a moving distance determined based on a sensor for detecting a region around a vehicle with each other. In addition, according to the proposal, when a traveling direction is determined to be misrecognized, a traveling direction recognized by a controller for calculating output torque of vehicle may be reversed, and control for preventing a powertrain from being damaged may be performed depending on a current transmission gear.

Figure 5:
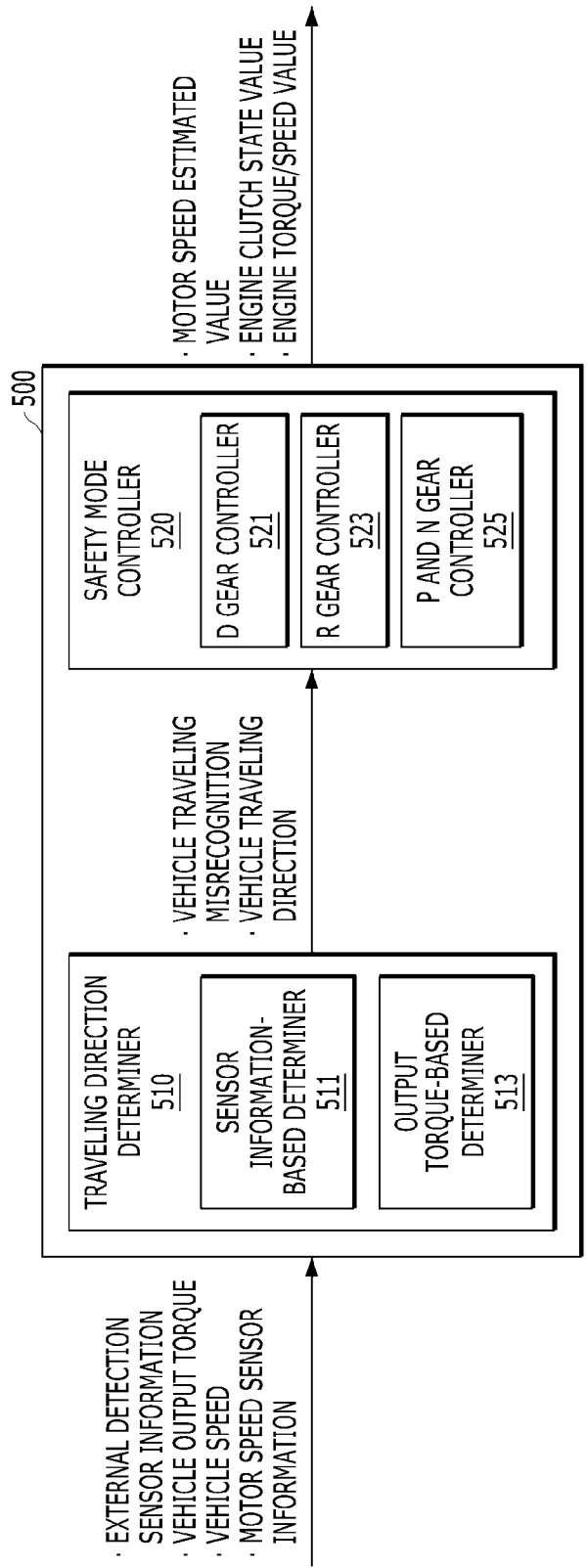
FIG. 5 is diagram showing an example of a configuration of a controller for calibrating a traveling direction in one form of the present disclosure.
Figure 6:
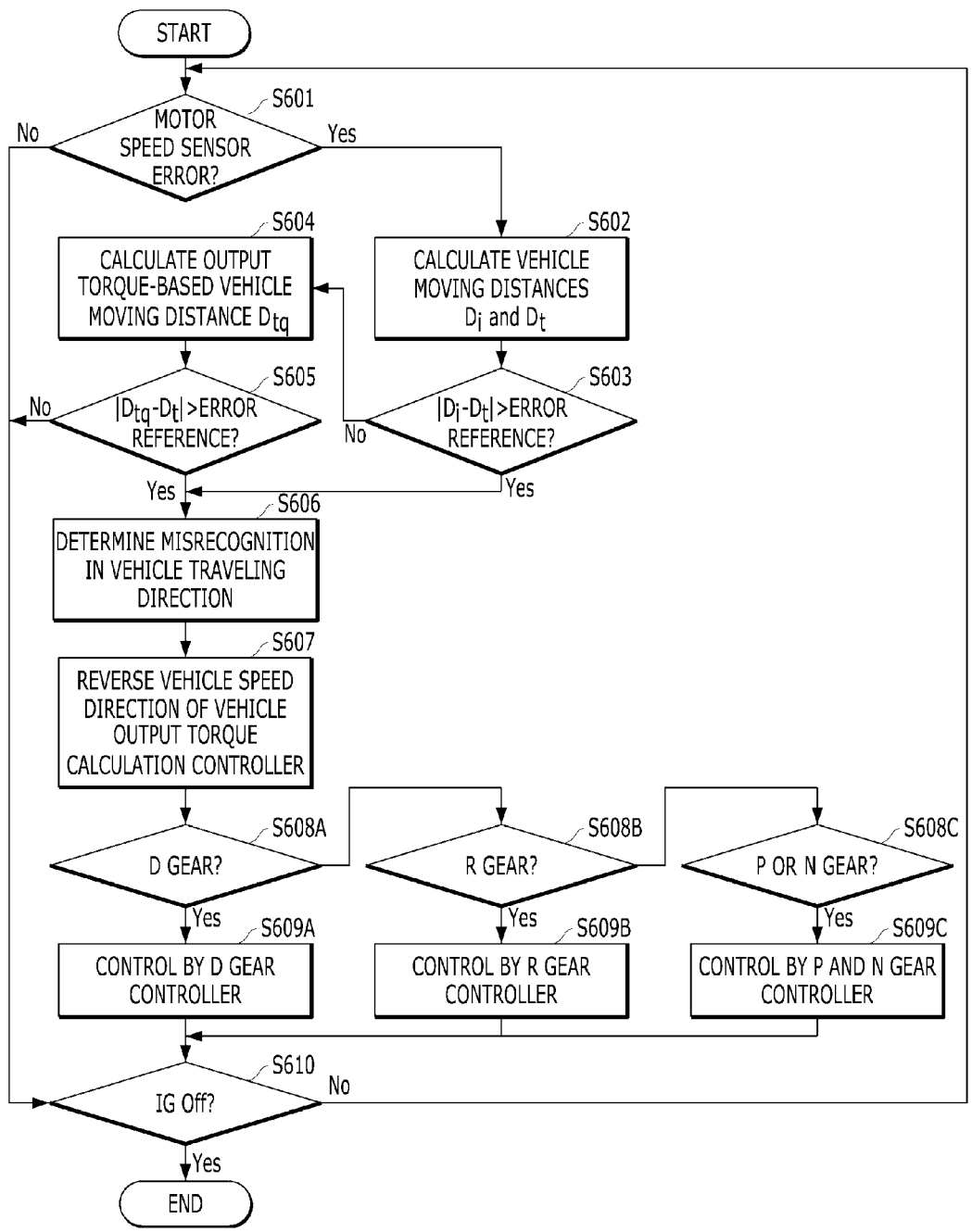
FIG. 6 is a flowchart showing an example of a procedure of calibrating a traveling direction in a hybrid vehicle according to one form of the present disclosure.

FIG. 5 is diagram showing an example of a configuration of a controller for calibrating a traveling direction according to one form of the present disclosure. FIG. 6 is a flowchart showing an example of a procedure of calibrating a traveling direction in a hybrid vehicle according to one form of the present disclosure.

First, referring to FIG. 5, a controller 500 for calibrating a traveling direction may include a traveling direction determiner 510 for determining whether a traveling direction is misrecognized when abnormality occurs in a speed sensor of a motor, and a safety mode controller 520 for controlling a safety mode depending on a current transmission gear, that is, a position of a gear lever when a traveling direction is determined to be misrecognized.

The traveling direction determiner 510 may include a sensor information-based determiner 511 for re-determining a moving distance for a predetermined time based on information collected from sensors for detecting a distance from an obstacle outside a vehicle or around the vehicle, and an output torque-based determiner 513 for determining a moving distance for a predetermined time based on output torque.

The safety mode controller 520 may include a D gear controller 521, an R gear controller 523, and a P and N gear controller 525 depending on a position of a gear lever.

The controller 500 for calibrating a traveling direction may have external detection sensor information, vehicle output torque information, vehicle speed information, and speed sensor information of a motor as input information, and may have a motor speed estimated value, an engine clutch state value, and an engine torque/speed value as an output value. Here, the external detection sensor information may refer to information obtained from one or more sensors for detecting a distance from an obstacle outside a vehicle or around the vehicle. For example, the external detection sensor information may include on a distance from an external object, detected through at least one of a radar, an ultrasonic sensor, or a vision sensor (camera). The vehicle output torque may be acquired from the HCU 240 and the vehicle speed information may be acquired from a vehicle speed sensor (wheel sensor) or a global positioning system (GPS). The motor speed sensor information may be acquired from the MCU 220 or through the HCU 240 when a sensor value contained in the motor 140 is transferred to the MCU 220. Needless to say, the aforementioned type and source of each piece of information are exemplary and the present disclosure is not limited thereto.

The controller 500 needs information on the motor 120 and output torque information of a vehicle and is also accompanied by control of a powertrain in a safety mode, and may be embodied as one function of the HCU 240. However, the present disclosure is not limited thereto, and the controller 500 may be embodied as a separate controller and may also be embodied in the form included in other controllers such as the engine controller 210.

Hereinafter, a method of calibrating a traveling direction and an operation of the controller 500 for performing the method will be described in detail with reference to FIG. 6 with FIG. 5.

First, the traveling direction determiner 510 may monitor whether motor speed sensor information is abnormal (S601), and when the motor speed sensor information is abnormal (YES of S601), the sensor information-based determiner 511 may calculate a moving distance based on external detection sensor information obtained by detecting the outside of a vehicle (S602).

In detail, a sensor information based moving distance Di may be calculated as the largest distance, for example, max(Dic, Dir, Diu, Dig, . . . ) of a moving distance between a measurement start time T1 and a measurement end time T2 from a stationary object, acquired from various sensors. A measurement period T2−T1 may be variously set and is not limited to a specific value.

For example, Dic refers to a moving distance based on an object recognized to be stationary for a corresponding time in an image captured through a camera, and Dir refers to a moving distance of a vehicle based on a stationary object recognized through a radar. In addition, Diu refers to a moving distance based on a Dig GPS based on a stationary object recognized through an ultrasonic sensor. For example, when a sensor detects a front side outside a vehicle, if a distance from an object recognized to be stationary is narrowed, the vehicle may be determined to be moved forward by a corresponding distance.

In some forms of the present disclosure, an average value or a smallest value may be used instead of the largest value of a moving distance detected through each sensor.

The sensor information-based determiner 511 may compare the sensor information based moving distance Di with a moving distance Dt recognized by a controller for calculating vehicle output torque and may determine whether a difference is greater than a preset error reference (e.g., 1 m) (S603). Here, the controller for calculating the vehicle output torque may be the HCU 240, and the recognized moving distance Dt may be obtained according to "vehicle speed*(T2−T1)". In this case, the vehicle speed may be acquired from a general vehicle speed sensor such as a wheel sensor and may be an average vehicle speed between T2 and T1.

When a difference |Di−Dt| is greater than an error reference (YES of S603), the traveling direction determiner 510 may determine whether misrecognition occurs in a vehicle traveling direction (S606).

In contrast, when the difference |Di−Dt| is equal to or less than the error reference (NO of S603), the output torque-based determiner 513 may re-determine whether misrecognition occurs. To this end, the output torque-based determiner 513 may calculate a vehicle moving distance Dtq based on output torque (S604). The output torque-based vehicle moving distance Dtq may be obtained according to Vavg*(T2−T1), and Vavg may be an average vehicle speed between T1 and T2 and may be acquired based on output torque according to Equation 1 below.

$$v_{avg} = \int_{T1}^{T2} \frac{F_t - F_d}{m} dt \quad \text{[Equation 1]}$$

In Equation 1, Ft refers to vehicle driving torque, Fd refers to vehicle resistance torque, and a difference Ft and Fd therebetween corresponds to final output torque of a vehicle.

As shown in Equation 2 below, the vehicle driving torque may be acquired according to Equation 2 below, and the vehicle resistance torque may be acquired according to Equation 3 below.

$$F_t = Tq_{Tm\_in} * i_t * i_f * \frac{1}{r_w} \quad \text{[Equation 2]}$$

$$F_d = \frac{1}{2}\rho_{air}C_d A_f v^2 + f_r mg\cos\theta + mg\sin\theta \quad \text{[Equation 3]}$$

The meaning of signs in Equations 2 and 3 is shown in Table 1 below.

TABLE 1

| | |
|---|---|
| $Tq_{Tm\_in}$ | Transmission input torque |
| $i_t$ | Transmission gear ratio |
| $i_f$ | longitudinal deceleratoin ratio |
| $r_w$ | Wheel radius |
| $\rho_{air}$ | Air density |
| $C_d$ | Air resistance coefficient |
| $A_f$ | Vehicle front surface area |

TABLE 1-continued

| | |
|---|---|
| $f_r$ | Rolling resistance coefficient |
| $\theta$ | Inclination |

The output torque-based determiner 513 may compare the output torque-based vehicle moving distance Dtq calculated using Equations 1 to 3 above with the moving distance Dt recognized by a controller for calculating vehicle output torque and may determine whether a difference therebetween is greater than a preset error reference (e.g., 1 m) (S605). Here, the recognized moving distance Dt may be the same as the moving distance Dt use in the aforementioned sensor information-based determiner 511.

When the difference |Dtq−Dt| is greater than the error reference (YES of S605), the traveling direction determiner 510 may determine that misrecognition in a traveling direction occurs in the controller for calculating the vehicle output torque (S606).

When determining that misrecognition occurs, the traveling direction determiner 510 may notify the controller for calculating the vehicle output torque about information indicating that misrecognition occurs in the traveling direction (i.e., vehicle speed direction), and thus, the controller for calculating the vehicle output torque may reverse and calibrate the traveling direction (S607).

As the traveling direction determiner 510 determines that misrecognition occurs, the safety mode controller 520 may determine a current gear lever position (S608A to S608C), and safety mode control may be performed by a controller corresponding to the determined current gear lever position among the D gear controller 521, the R gear controller 523, and the P and N gear controller 525 (S609A, S609B, and S609C)

The gear controllers 521, 523, and 525 may perform state estimation and operation control of a powertrain along with control for preventing the powertrain from being damaged depending on the characteristics of a corresponding transmission gear.

In detail, the D gear controller 521 may perform safety mode control as follows.

1) Maintain open state of the engine clutch 130.

This is because the engine clutch 130 and the engine 110 need to be prevented from being damaged due to malfunction of the motor 140.

2) High-voltage battery charge by driving the engine 110.

This is because a state of charge (SoC) of a battery for motor driving needs to be maintained. In this case, engine torque and RPM may be controlled in an idle state (e.g., 1,000 RPM) but may be controlled in a different way therefrom depending on a SoC.

3) Estimate motor speed as value obtained by dividing transmission speed by gear ratio.

When a transmission is in a lock state, a motor speed may be estimated as a value obtained by dividing a speed of an output end of a transmission in a current gear stage by a gear ratio of a corresponding gear stage. When the transmission is in a sleep state (e.g., during gear shift), an intermediate gear ratio value of a current gear stage and a target gear stage may be applied to estimate a motor speed. When the estimated motor speed may be provided to the controller or calculating the vehicle output torque.

Basically, the R gear controller 523 may perform similar safety mode control to the D gear controller 521, but may apply a fixed gear ratio of an R gear to estimate a motor speed and may use an opposite sign of a speed to that in the D gear controller 521.

The P and N gear controller 525 may control the engine clutch 130 in an open state, and when a SoC is sufficient, the P and N gear controller 525 may perform control not to perform battery charge through engine driving.

The aforementioned control procedure may be repeatedly performed until the vehicle is turned off (S610).

Although FIG. 6 illustrates the case in which the sensor information-based determiner 511 and the output torque-based determiner 513 sequentially determine whether misrecognition of a controller or calculating vehicle output torque occurs, this is exemplary, and determination sequences of the sensor information-based determiner 511 and the output torque-based determiner 513 may be reversed or the sensor information-based determiner 511 and the output torque-based determiner 513 may be configured to independently calculate a moving distance difference irrespective of the determination result therebetween. When independent calculation is performed, the traveling direction determiner 510 may determine that misrecognition occurs even when a moving distance difference of only any one of the determiners 511 and 513 is greater than the error reference.

The aforementioned determination result of a shift map may be output in the form recognizable by a driver. In one form of the present disclosure, the hybrid vehicle may include a display of a cluster, a head unit, or an audio/video/navigation (AVN) system, or a display device of a head up display (HUD). When receiving a signal indicating whether safety control is performed due to abnormality of a motor speed sensor, the display device may display corresponding information, which will be described with reference to FIG. 7.

Figure 7:
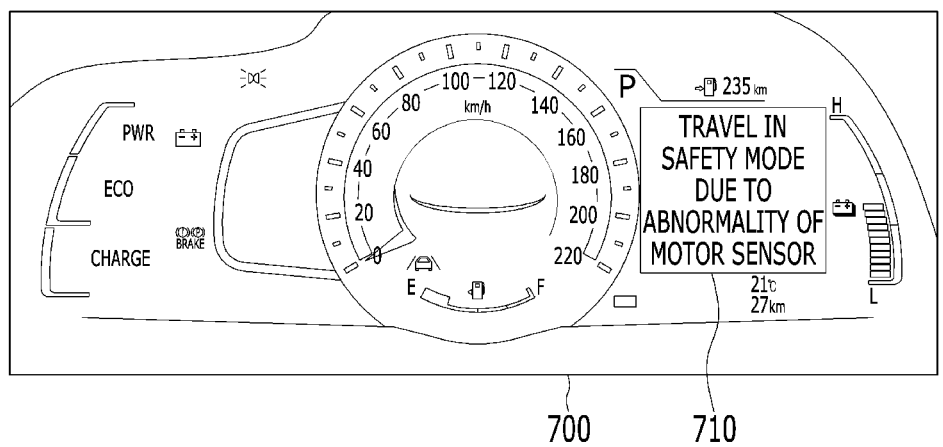
FIG. 7 is a diagram showing that calibration control and safety control are performed due to abnormality of a motor speed sensor in one form of the present disclosure.

FIG. 7 is a diagram showing the form in which calibration control and safety control are performed due to abnormality of a motor speed sensor according to one form of the present disclosure.

Referring to FIG. 7, a hybrid vehicle in one form may output a result of whether safety control is performed due to abnormality of a motor speed sensor in the form of a text in one region 710 of a cluster 700, in which text display is allowed.

Needless to say, such a display form is exemplary, and the text may be replaced with a warning light that blinks at a fixed position, or may be displayed in the form of an icon.

In addition, needless to say, a displayed position as well as the display form may also be changed to another position in a cluster, or changed to a display of an AVN system or a head unit, or a head up display.

The hybrid vehicle including a transmission without a reverse gear related to at least one form of the present disclosure as configured above may calibrate a traveling direction even if abnormality occurs in a speed sensor of a motor.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the present disclosures. Thus, it is intended that the present disclosure cover the modifications and variations of this present disclosure.

What is claimed is:

1. A method of calibrating a traveling direction of a hybrid vehicle including a transmission without a reverse gear, the method comprising:
when an abnormality of a motor speed sensor is detected, calculating, by a controller, a difference between at least one of a first moving distance calculated based on sensor information during a predetermined time or a second moving distance calculated based on an output torque and a third moving distance calculated based on a vehicle speed;
when an absolute value of the calculated difference is greater than a preset error reference, reversing, by the controller, the traveling direction recognized by the hybrid vehicle; and
controlling, by the controller, a powertrain in response to a transmission lever state.

2. The method of claim 1, wherein the first moving distance is calculated using a distance change during the predetermined time from an external fixed object based on information acquired from each of at least one sensor for detecting at least an object outside the hybrid vehicle.

3. The method of claim 2, wherein the at least one sensor includes at least one of a camera, a radar, or an ultrasonic sensor; and
wherein the first moving distance is calculated in consideration of an arrangement position of each of the at least one sensor.

4. The method of claim 1, wherein the second moving distance is calculated by multiplying an average vehicle speed by a length of the predetermined time; and
wherein the average vehicle speed is calculated by integrating a value obtained by dividing a difference between a vehicle driving torque and a vehicle resistance torque by a vehicle mass with respect to the predetermined time.

5. The method of claim 1, wherein the third moving distance is calculated by multiplying a vehicle speed acquired from a wheel sensor during the predetermined time by a length of the predetermined time.

6. The method of claim 1, wherein the hybrid vehicle includes a parallel type hybrid vehicle configured by disposing an engine clutch between an engine and a driving motor; and
wherein the controlling the powertrain includes maintaining the engine clutch in an open state.

7. The method of claim 1, wherein, when the transmission lever state is a drive (D) gear or a reverse (R) gear, controlling the powertrain includes:
charging a battery for supplying power to a driving motor by a starter generator motor connected to an engine; and
estimating a speed of the driving motor based on a speed of an output end of a transmission and a gear ratio.

8. The method of claim 7, wherein, when the transmission lever state is the D gear, the estimating includes estimating a speed of the driving motor based on an intermediate value of a gear ratio of a current gear stage and a gear ratio of a target gear stage when the transmission is in a sleep state.

9. A non-transitory computer-readable recording medium having a program recorded thereon, the program to direct a processor to perform acts of:
when an abnormality of a motor speed sensor of a hybrid vehicle is detected, calculating a difference between at least one of a first moving distance calculated based on sensor information during a predetermined time or a second moving distance calculated based on an output torque and a third moving distance calculated based on a vehicle speed;
when an absolute value of the calculated difference is greater than a preset error reference, reversing a traveling direction recognized by the hybrid vehicle; and
controlling a powertrain in response to a transmission lever state.

10. A hybrid vehicle comprising:
a transmission not having a reverse gear;
a driving motor including a speed sensor; and
a second controller configured to calibrate a traveling direction recognized by a first controller configured to control output torque when detecting an abnormality of the speed sensor,
wherein the second controller includes:
a traveling direction determiner configured to:
calculate a difference between at least one of a first moving distance calculated based on sensor information during a predetermined time or a second moving distance calculated based on output torque and a third moving distance calculated based on a vehicle speed, and
when an absolute value of the calculated difference is greater than a preset error reference, reverse the traveling direction recognized by the first controller; and
a safety mode controller configured to control a powertrain in response to a transmission lever state.

11. The hybrid vehicle of claim 10, wherein the traveling direction determiner includes a sensor information-based determiner configured to calculate the first moving distance using a distance change during the predetermined time from an external fixed object based on information acquired from at least one sensor for detecting at least an object outside the hybrid vehicle.

12. The hybrid vehicle of claim 11, wherein the at least one sensor includes at least one of a camera, a radar, or an ultrasonic sensor; and wherein the sensor information-based determiner is configured to calculate the first moving distance in consideration of an arrangement position of each of the at least one sensor.

13. The hybrid vehicle of claim 10, wherein the traveling direction determiner includes an output torque-based determiner configured to calculate the second moving distance by multiplying an average vehicle speed by a length of the predetermined time; and
wherein the output torque-based determiner is configured to calculate the average vehicle speed by integrating a value obtained by dividing a difference between a vehicle driving torque and a vehicle resistance torque by a vehicle mass with respect to the predetermined time.

14. The hybrid vehicle of claim 10, wherein the third moving distance is calculated by multiplying a vehicle speed acquired from a wheel sensor during the predetermined time by a length of the predetermined time.

15. The hybrid vehicle of claim 10, further comprising:
an engine; and
an engine clutch disposed between the engine and the driving motor,
wherein the safety mode controller is configured to maintain the engine clutch in an open state when the absolute value of the calculated difference is greater than the preset error reference.

16. The hybrid vehicle of claim 10, wherein, when the transmission lever state is a drive (D) gear or a reverse (R) gear, the safety mode controller is configured to:
charge a battery for supplying power to the driving motor by a starter generator motor connected to an engine and
estimate a speed of the driving motor based on a speed of an output end of a transmission and a gear ratio.

17. The hybrid vehicle of claim 16, wherein, when the transmission lever state is the D gear, the safety mode controller is configured to estimate a speed of the driving motor based on an intermediate value of a gear ratio of a current gear stage and a gear ratio of a target gear stage when the transmission is in a sleep state.

18. The hybrid vehicle of claim 10, wherein the first controller and the second controller are integrated in one controller.

19. The hybrid vehicle of claim 10, further comprising: a display configured to output information indicating that the safety mode controller controls the powertrain due to the abnormality of the speed sensor.

* * * * *